UNITED STATES PATENT OFFICE.

WM. G. HUYETT, OF WILLIAMSBURG, PENNSYLVANIA.

IMPROVEMENT IN PAINT COMPOUNDS.

Specification forming part of Letters Patent No. 20,205, dated May 11, 1858.

*To all whom it may concern:*

Be it known that I, W. G. HUYETT, of Williamsburg, in the county of Blair and State of Pennsylvania, have invented a new and useful Paint Compound to be used for painting; and I do hereby declare that the following is a full, clear, and exact description of the same.

This invention consists in a new article of manufacture—viz., a paint compound, made as hereinafter set forth.

To enable others skilled in the art to make and use my invention, I will proceed to describe the same briefly and clearly.

I take any of the common iron ores (but that which contains the greatest amount of metal is preferred) and break it into small pieces and heat it up to a red heat in a furnace, which heat is continued for about four hours, when the ore is removed and cooled. I then mix seventy parts, by weight, of this calcined ore with twenty parts of burned limestone and ten parts of clean charcoal or mineral coal, and grind them all together to a fine powder in any suitable mill. I then mix this powder with linseed-oil and reduce it to a proper consistency for painting, when it forms a beautiful brown-colored paint, very durable, and owing to the lime it contains its nature is partially fire-proof. Its color may be modified or altered by mixing it with other paints or substances.

The materials of which this paint is composed are very common and universal and cheap. The paint itself is more durable and beautiful than any other with which I am acquainted that can be manufactured as economically.

Such a paint will be a great boon to farmers, planters, and others, inasmuch as they can obtain it for painting outhouses, barns, roofs, fences, &c., at such a very small cost.

I do not confine myself to the exact proportions specified; but I have found them to be the best. A small variation, however, in the quantities does not much affect the good qualities of the mixture. I, however, base my claim upon the materials forming the compound.

I do not claim the use of calcined iron ore, lime, or coal, except when compounded so as to form a paint, as described by me. To the best of my knowledge and belief no such paint compound has ever been known or used, and therefore

I claim and desire to secure by Letters Patent—

As a new article of manufacture, a paint compound composed of ground calcined iron ore, lime, and carbon, in about the proportions specified.

W. G. HUYETT.

Witnesses:
ISAAC YINGLING,
JACOB YINGLING.